Dec. 21, 1943.  G. A. WHALMARK  2,337,511
ANTIFRICTION BEARING
Filed Aug. 1, 1940  2 Sheets-Sheet 1
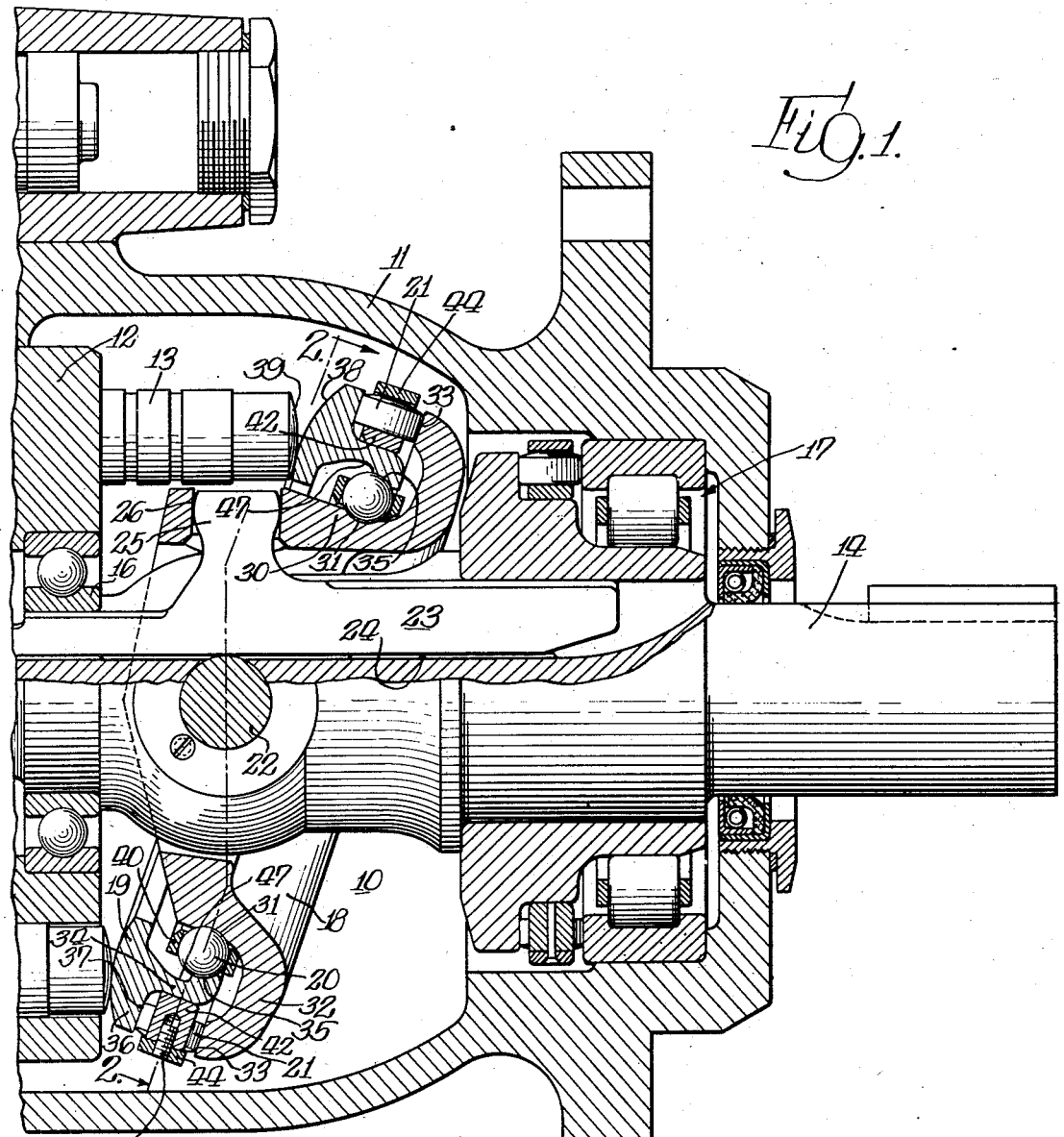
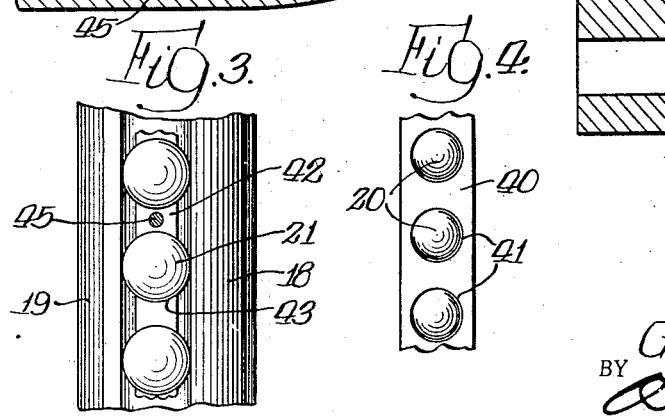
INVENTOR.
Gunnar A. Wahlmark,
BY Dec. 21, 1943.   G. A. WHALMARK   2,337,511
ANTIFRICTION BEARING
Filed Aug. 1, 1940   2 Sheets-Sheet 2
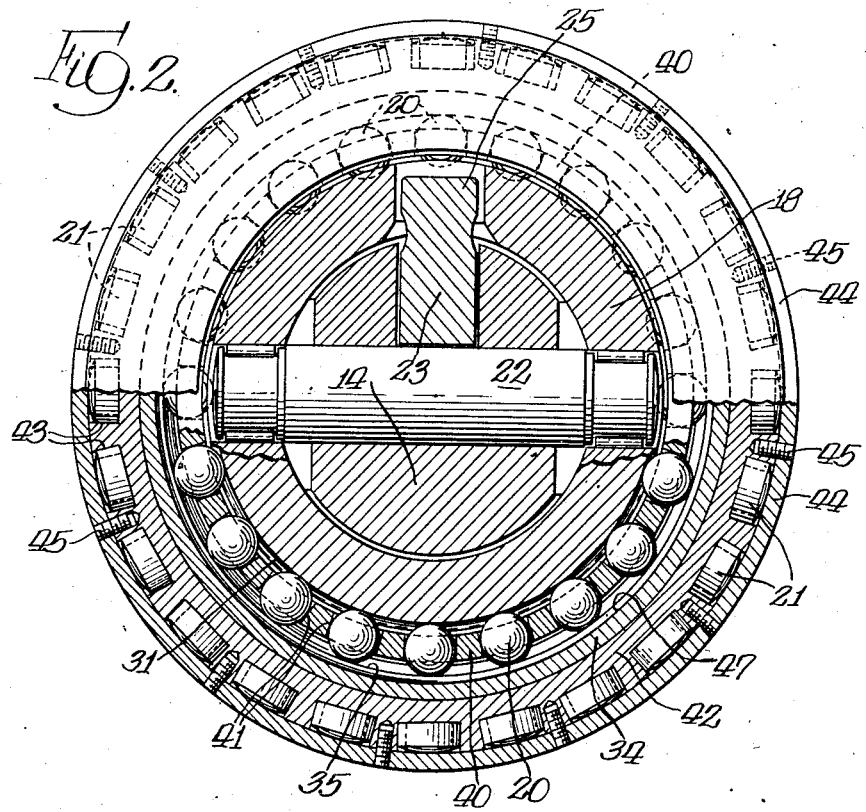
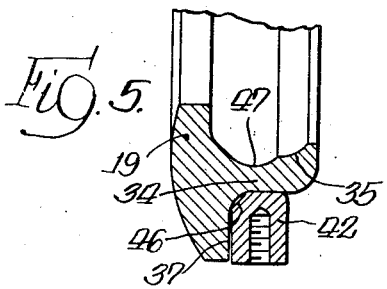
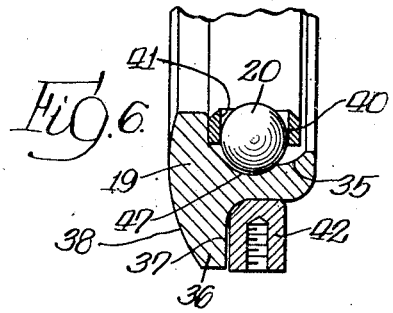
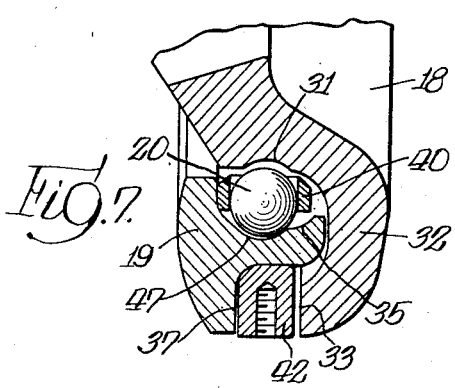
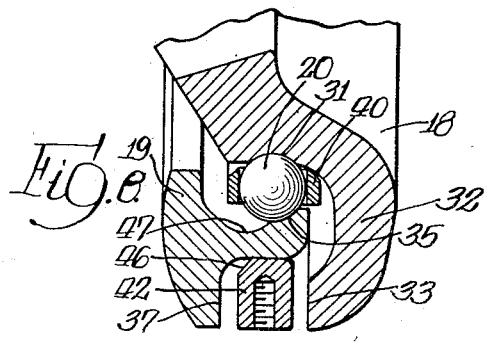
INVENTOR.
Gunnar A. Wahlmark
BY
his Atty.

UNITED STATES PATENT OFFICE 2,337,511

ANTIFRICTION BEARING

Gunnar A. Wahlmark, Rockford, Ill.

Application August 1, 1940, Serial No. 349,163

15 Claims. (Cl. 308—174)

This invention relates more particularly to a "double row" anti-friction bearing in the sense that it includes two sets of anti-friction members.

It is the object of the invention to provide a new and improved anti-friction thrust bearing wherein the anti-friction members act to lock the parts of the bearing against separation in a direction axially of the bearing.

Another object is to provide an anti-friction bearing having two races provided with a set of ball raceways and a pair of roller raceways and anti-friction members cooperated therewith to maintain the bearing in an assembled condition.

Another object is to provide a double row bearing having two races, opposed ball grooves on said races arranged to receive a series of balls to form a combined radial and thrust bearing effective to prevent separation of the races axially thereof and opposed flat annular roller raceways on said races arranged to receive a series of rollers tending to separate the races and preload the balls and rollers.

Another object is to provide a method of assembling such an anti-friction bearing.

Other objects will become readily apparent from the following detailed description taken in connection with the accompanying drawings, wherein:

Fig. 1 is a fragmentary central section through a pump having a wobbler embodying a preferred form of the invention.

Fig. 2 is a section approximately along the line 2—2 of Fig. 1.

Fig. 3 is a fragmentary view looking toward the periphery of the wobbler.

Fig. 4 is a fragmentary view looking at the periphery of the ball retainer.

Figs. 5, 6, 7 and 8 are fragmentary sections illustrating the parts in various positions assumed during the assembly of the bearing.

While there is illustrated in the drawings and hereinafter described in detail a preferred form of the invention, it is to be understood that the invention is not to be limited to the particular form of arrangement shown, it being contemplated that various changes may be made by those skilled in the art without departing from the spirit and scope of the appended claims.

As illustrated in the drawings, and more particularly in Figs. 1 and 2, the invention is embodied in a wobbler 10 of a pump having a casing 11, an annular cylinder block 12, a plurality of pistons 13, and a shaft 14 rotatably mounted on the cylinder block by means of ball bearing 16 and on the casing by means of a double roller bearing 17. The wobbler 10 has an inner annular member 18 and an outer annular member 19, the inner member being rotatable with respect to the outer member due to the provision of a series of balls 20 and a series of rollers 21 positioned between raceways formed on the inner and outer members. As illustrated herein the inner member is pivotally mounted on the shaft 14 by means of a pin 22 and is arranged to be adjusted angularly with respect to the shaft by means of a member 23 slidable longitudinally in a keyway 24 in the shaft and provided with an outwardly projecting arm 25 engaging in an aperture 26 in the member 18.

In a wobbler such as illustrated, it is necessary to provide a thrust bearing which will operate satisfactorily in spite of the fact that the thrust load thereon is not uniformly distributed throughout the periphery of the bearing but is constantly traveling along the races of the bearing as the wobbler operates to move the pistons of the pump one after another through their compression strokes. In the form of the invention disclosed this desirable result is attained by providing a roller type of thrust bearing between inner and outer members 18 and 19 which are of unitary construction, together with a ball type combined radial and thrust bearing so that the bearings may be preloaded and function also to hold the annular members 18 and 19 against separation, the locking effect being obtained directly through the anti-friction members and their associated raceways.

The inner member 18 which forms one race of the double bearing has a substantially cylindrical portion 30 provided with a ball groove 31. An outwardly extending flange portion 32 of the inner member 18 has a flat annular surface 33 forming one of the roller raceways for the rollers 21. The piston contacting surface of the member 19 is preferably curved as shown at 38, this surface operating against the spherical end surfaces 39 on the pistons 13. The balls 20 are maintained in properly spaced relation by means of a retainer 40 which is herein shown in the form of a ring having a plurality of radial ball receiving bores 41 therein. The rollers 21 are maintained in proper spaced relation by means of a retaining ring 42 having a plurality of circularly formed recesses 43 extending part way therethrough from its outer periphery. A lock ring 44 for the rollers is secured to the retaining ring 42 by means of a plurality of screw devices 45.

The rollers 21 cooperate with their raceways to form an efficient thrust bearing between the members 18 and 19. Preferably, the rollers 21 are slightly smaller in diameter adjacent their ends than at the midportions, whereas the roller raceways are flat and parallel. In a bearing such as that illustrated the rollers may, for example, be 1/10000 inch smaller in diameter at the ends than in the middle. Since the ball bearing formed by the balls 20 and the associated raceways 31 and 35 is a combination radial and thrust bearing, this ball bearing serves to prevent separation of the members 18 and 19 axially thereof. Due to the method of assembly of the parts hereinafter described, it is possible to assemble the wobbler with the bearings in a preloaded condition.

The assembly of the bearing may be most readily understood by reference to Figs. 5 to 8. Fig. 5 illustrates the first step in the assembly of the bearing. In this figure the roller retainer 42, without the rollers therein, is placed on the tubular portion of the outer annular member 19 and as far to the left as possible. It will be noted that one corner 46 of the retainer 42 is beveled so as to permit the retainer to be so positioned. The next step in the assembly of the bearing is illustrated in Fig. 6. Therein the ball retainer 40, together with the balls 20, has been placed within the tubular portion of the member 19 and has been moved toward the left beyond the ball raceway 35 so that the balls may move outwardly into an assembly groove 47 in the member 19. With the balls moved outwardly from their final position in the retainer 40, as illustrated in Fig. 6, and the roller retainer 42 located as shown, it is possible to place the inner annular member 18 in the position illustrated in Fig. 7. It will be noted that the annular member 18 in Fig. 7 is farther toward the left than it is in the normal operating position shown in Fig. 1. When the parts have been assembled in the position shown in Fig. 7, the ball retainer 40 can be moved toward the right to place the balls against the raceways 31 and 35 so that by then moving the member 18 away from the member 19 the balls 20 are properly assembled between their raceways as illustrated in Fig. 8. The roller retainer 42 is then moved to its normal position as shown in Fig. 8 midway between the roller raceways 33 and 37.

With the parts as illustrated in Fig. 8, the rollers 21 are inserted in the recess 43 of the roller retainer 42 so that they operate on the raceways 33 and 37 and after all of the rollers have been inserted in this manner the lock ring 44 is secured to the roller retainer 42 by means of the screws 45, the final position of the parts being illustrated in Fig. 1. The parts are so proportioned that when the rollers are inserted between their raceways a preload is placed on the rollers as well as on the balls 20, thus taking up all play between the parts of the bearing.

It will be readily apparent that the invention in the form illustrated results in a bearing wherein the preloading forces are all confined to the anti-friction members themselves and their associated raceways and that none of these forces is on the retainers or the locking ring 44. Furthermore, since the annular members 18 and 19 are of unitary or single piece construction, there are no joints under stress which may become loosened during the operation of the bearing.

I claim as my invention:

1. An anti-friction bearing comprising a first race having a substantially cylindrical portion with a combination radial and thrust ball groove therein and an outwardly extending flange with an axially directed annular flat thrust surface forming a roller raceway facing in opposed direction to the thrust portion of said ball groove, a second race having a tubular portion surrounding the cylindrical portion of the first race and having a corresponding combination radial and thrust ball groove therein and an outwardly extending flange provided with a flat annular thrust surface opposite said roller raceway, balls engaging said ball grooves to form a combination radial and thrust bearing, a retainer for the balls, rollers between said roller raceways forming an oppositely directed thrust bearing and a retainer for said rollers.

2. An anti-friction bearing comprising a first annular race member having a cylindrical portion with an outwardly directed ball raceway and an integral outwardly extending flange provided with a flat annular roller raceway faced in one direction longitudinally of the bearing axis, a second annular race member having a portion provided with a flat annular roller raceway opposite to said first mentioned roller raceway and an integral portion surrounding the cylindrical portion of the first race member provided with a ball raceway opposite said first mentioned ball raceway and faced partly in a direction longitudinally of the bearing axis opposite to said last mentioned roller raceway, a series of rollers between said roller raceways forming a thrust bearing, a retainer for the rollers, a set of balls on the ball raceways forming a combined radial and thrust bearing acting to preload the rollers on the roller raceways, and a retainer for said balls.

3. An anti-friction bearing comprising a first race having a substantially cylindrical portion with a combination radial and thrust ball groove therein, a deeper ball assembly groove adjacent said first groove, and an outwardly extending radial flange with an annular flat thrust surface forming a roller raceway facing in a direction axially opposite to the thrust portion of said ball groove, a second race having a cylindrical portion radially opposite the cylindrical portion of the first race and having a corresponding combination radial and thrust ball groove therein and an outwardly extending flange provided with a flat annular thrust surface opposite said roller raceway, balls engaging said ball grooves to form a combination radial and thrust bearing, a retainer for the balls, rollers between said roller raceways forming an oppositely directed thrust bearing and a retainer for said rollers.

4. A double row anti-friction bearing having a first race, a second race, opposed ball grooves on said races, balls thereon forming a combined radial and thrust bearing preventing separation of the races one way in an axial direction, one of said races having a deeper ball assembly groove adjacent its ball groove, opposed flat annular surfaces on said races forming roller raceways and rollers between said roller raceways forming a thrust bearing preventing movement of the races toward each other.

5. An anti-friction bearing comprising a first annular race member having a cylindrical portion with an outwardly directed ball raceway and an integral outwardly extending flange provided with a flat annular roller raceway faced in one direction longitudinally of the bearing axis, a second annular race member having a portion provided with a flat annular roller raceway opposite to said first mentioned roller raceway and an integral portion surrounding the cylindrical portion of the first race member provided with a ball raceway opposite said first mentioned ball raceway and faced partly in a direction longitudinally of the bearing axis opposite to said last mentioned roller raceway, said second race member having a ball assembly groove adjacent the ball raceway thereon, a series of rollers between said roller raceways forming a thrust bearing, a retainer for the rollers, a set of balls on the ball raceways forming a combined radial and thrust bearing acting to preload the rollers on the roller raceways, and a retainer for said balls.

6. A double-row anti-friction bearing having a first race, a second race, a radially directed ball groove in one of said races, a ball raceway in the other race opposite said ball groove and faced partly in a direction longitudinally of the bearing axis, an assembly groove alongside of the ball raceway, a set of balls operating in the ball groove and the ball raceway forming a combined radial and thrust bearing, opposed flat annular roller raceways on said races faced longitudinally of the bearing axis, rollers insertable radially between said flat raceways, and means for holding the rollers against radial outward loss.

7. In a double-row anti-friction bearing, a first race, a second race, opposed ball grooves on said races, anti-friction members therebetween forming a combined radial and thrust bearing preventing relative movement of the races axially away from one another in one direction, and an assembly groove alongside of one of the ball grooves.

8. An anti-friction bearing structure comprising an outer annular member having a flange providing an annular flat raceway directed in one direction strictly axially thereof, an inner annular member having an annular flat raceway opposed to the raceway in said outer member and directed strictly axially thereof, anti-friction members operating between the raceways to form a pure thrust bearing holding the annular members against movement toward one another, and means forming a combined radial and thrust bearing holding the annular members against separation, said means comprising radially opposed, circumferentially uninterrupted raceways on said annular members and anti-friction members operating therebetween.

9. An anti-friction bearing structure comprising an outer annular member having a circumferential, radially directed raceway, an inner annular member adapted to be received partially within said outer member having a circumferential raceway opposed to the raceway in said outer member, anti-friction members operating between said raceways, and a circumferential anti-friction member assembly groove in one of said annular members parallel with and deeper than the raceway therein, said anti-friction members when in position between said raceways preventing withdrawal of said inner member in the direction from which it was inserted.

10. An anti-friction bearing structure comprising an outer annular member having a circumferential, radially directed raceway, an inner annular member adapted to be received partially within said outer member having a circumferential raceway opposed to the raceway in said outer member, anti-friction members operating between said raceways, a circumferential anti-friction member assembly groove in one of said annular members parallel with and deeper than the raceway therein, said anti-friction members when in position between said raceways preventing withdrawal of said inner member in the direction from which it was inserted, axially directed opposed raceways on said annular members and anti-friction members operating therebetween to form a thrust bearing.

11. An anti-friction bearing structure comprising an outer annular member having a circumferential, radially directed raceway, an inner annular member adapted to be received partially within said outer member having a circumferential raceway opposed to the raceway in said outer member, anti-friction members operating between said raceways, a circumferential anti-friction member assembly groove in one of said annular members parallel with and deeper than the raceway therein, said anti-friction members when in position between said raceways preventing withdrawal of said inner member in the direction from which it was inserted, an axially directed raceway on an integral part of one of said annular members, an opposed axially directed raceway on an integral part of the other of said annular members, and anti-friction members operating between said axially directed raceways, said last named anti-friction members and raceways being disposed to maintain said annular members separated to the extent permitted by said first named anti-friction members.

12. An anti-friction bearing structure comprising a first annular member having a raceway directed in one direction axially thereof, a second annular member having a raceway opposed to the raceway in said first member, anti-friction members operating between the raceways to form a thrust bearing holding the annular members against relative movement in one direction axially, means forming a combined radial and thrust bearing holding the annular members against relative movement in the opposite direction axially to preload said thrust bearing, said means comprising radially opposed circumferentially uninterrupted raceways on said annular members and anti-friction members operating therebetween, and a circumferential groove in one of said annular members parallel with and deeper than the radially directed raceway.

13. An anti-friction bearing structure comprising a first integral annular member having a radially directed circumferentially uninterrupted raceway and an axially directed raceway, a second integral annular member having a radially directed circumferentially uninterrupted raceway and an axially directed raceway respectively opposing said radially directed raceway and said axially directed raceways in said first member, one of said members partially surrounding the other in assembled position, a first set of anti-friction members normally disposed between said radially directed raceways to form therewith a combined radial and thrust bearing preventing relative movement of said annular members in one direction axially, an annular retainer between said axially directed raceways having radially opening recesses for anti-friction members, a set of anti-friction members in said retainer preventing relative movement of the annular members in the opposite direction axially, and a ring for retaining the members in said retainer.

14. An anti-friction bearing structure comprising a first annular member having a raceway directed in one direction strictly axially thereof, a second annular member having a raceway opposed to the raceway in said first member and directed strictly axially thereof, anti-friction members operating between the raceways to form a pure thrust bearing holding the annular members against relative movement in one direction axially, and means forming a combined radial and thrust bearing holding the annular members against relative movement in the opposite direction axially to preload said thrust bearing, said means comprising radially opposed, circumferentially uniformly continuous raceways on said annular members and anti-friction members operating therebetween, said thrust bearing and said radial bearing lying in substantially the same transverse plane.

15. An anti-friction bearing structure comprising a first annular member having a raceway directed in one direction axially thereof, a second annular member having a raceway opposed to the raceway in said first member, anti-friction members operating between the raceways to form a thrust bearing holding the annular members against relative movement in one direction axially, and means forming a combined radial and thrust bearing holding the annular members against relative movement in the opposite direction axially to preload said thrust bearing, said means comprising radially opposed circumferentially uninterrupted raceways on said annular members and anti-friction members operating therebetween, and a closed annular retainer ring for said last named anti-friction members.

GUNNAR A. WAHLMARK.